(12) United States Patent
Schneider

(10) Patent No.: US 7,318,615 B2
(45) Date of Patent: Jan. 15, 2008

(54) HOLDER FOR A FOOD AND/OR BEVERAGE CONTAINER

(75) Inventor: Andreas Schneider, Freudenstadt (DE)

(73) Assignee: Dr. Ing. h.c.F. Porsche Aktiengesellschaft, Stuttgart (DE)

( * ) Notice: Subject to any disclaimer, the term of this patent is extended or adjusted under 35 U.S.C. 154(b) by 268 days.

(21) Appl. No.: 11/073,606

(22) Filed: Mar. 8, 2005

(65) Prior Publication Data

US 2005/0236858 A1 Oct. 27, 2005

(30) Foreign Application Priority Data

Mar. 30, 2004 (DE) ................ 10 2004 015 341

(51) Int. Cl.
*B60N 3/10* (2006.01)
(52) U.S. Cl. ...................................... 296/37.1
(58) Field of Classification Search ............... 296/24.3, 296/37.1, 37.8, 37.9, 37.12
See application file for complete search history.

(56) References Cited

U.S. PATENT DOCUMENTS

| | | | |
|---|---|---|---|
| 5,228,611 A * | 7/1993 | Yabuya | 224/281 |
| 6,024,395 A * | 2/2000 | Kang | 296/37.8 |
| 6,669,248 B2 | 12/2003 | Shirase | |
| 6,830,277 B2 * | 12/2004 | Zierle et al. | 296/37.12 |
| 2004/0084921 A1* | 5/2004 | Yanagita | 296/37.12 |
| 2005/0225112 A1* | 10/2005 | Stephan et al. | 296/37.12 |

FOREIGN PATENT DOCUMENTS

| | | |
|---|---|---|
| DE | 195 14 154 A1 | 11/1995 |
| DE | 197 17 011 A1 | 11/1998 |
| DE | 298 22 840 U1 | 3/1999 |
| JP | 6-115390 A | 4/1994 |
| JP | 2003-106027 A | 4/2003 |

OTHER PUBLICATIONS

European Search Report dated Sep. 17, 2007 with English Translation of relevant portion (Four (4) pages).

* cited by examiner

*Primary Examiner*—H Gutman
(74) *Attorney, Agent, or Firm*—Crowell & Moring LLP

(57) ABSTRACT

A housing with an opening, a handle for the container, a door, and a locking and releasing mechanism for the handle. The door opens or closes the opening in the housing according to the rest position and position of the handle. The handle is articulated on the housing and can be displaced to a retracted rest position and to a deployed position of use. The mechanism includes a first part disposed on the housing and a second part disposed on the handle, wherein the first or second part is arranged on the housing. One of the first and second parts includes as a control track, and the other includes a control pin engaging in the control track. The mechanism includes a third part that includes a lever movably journaled on the housing. The door is journaled for movement in a pivot shaft on the housing and, in its open position, is subjected to a closing force in the direction of its closed position. The lever journaled on the housing has a locking spur which holds the door in its open position until the holder is displaced from the position of use to the position of rest.

13 Claims, 2 Drawing Sheets

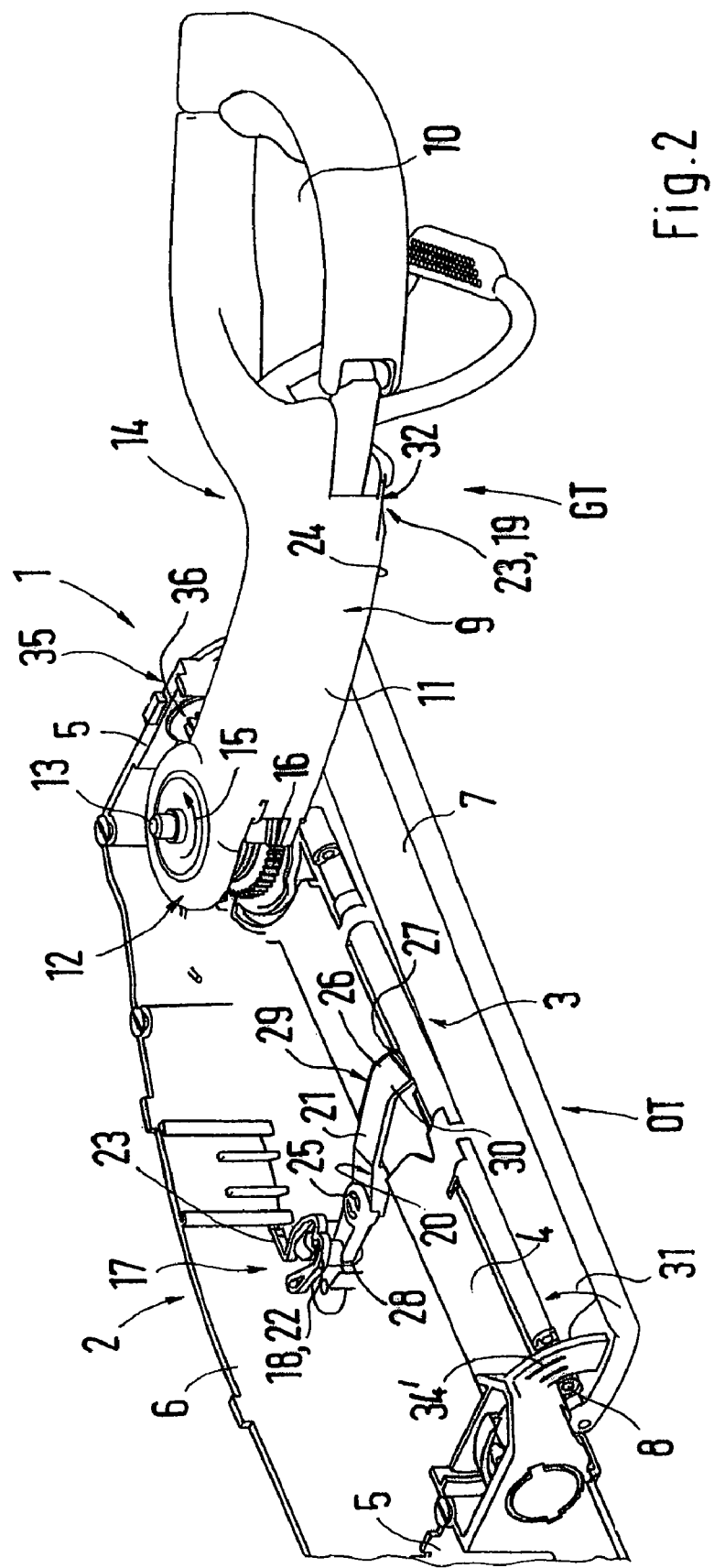

HOLDER FOR A FOOD AND/OR BEVERAGE CONTAINER

This application claims the priority of German Patent Application No. 10 2004 015 341.8, filed Mar. 30, 2004, the disclosure of which is expressly incorporated by reference herein.

BACKGROUND AND SUMMARY OF THE INVENTION

The invention relates to a holder for a food and/or beverage container.

A holding device, which can be arranged in motor vehicles and is also referred to as a cupholder, is disclosed in DE 195 14 154 A1. It has a casing, a handle articulated to the casing, which can be shifted to a retracted rest position in the casing and to a deployed position for use. Also, the holding device comprises a door which is affixed to the holder and thus exposes or conceals a casing opening according to the rest position and position for use. To keep the handle in the rest position and release it to the position for use the holder furthermore includes a locking and releasing mechanism for the handle. This mechanism has a first part arranged on the housing and a second part arranged on the handle. The first part is in the form of a control pin which is disposed on a third part of the mechanism, which is a movably mounted lever. The control pin enters a control track in the form of a cardioid curve which forms the second part and is arranged on the handle in the form of a linear movable slider.

DE 298 22 840 U1 discloses a container compartment which is formed by a housing whose opening can be released and closed by a door articulated on the housing. An opening force is applied to the door in the opening direction. Furthermore, a locking and unlocking mechanism is provided for the door and has a cardioid curve control.

An object of the invention is to provide a holder referred to above, which permits convenience of operation.

The object is achieved with a holder that has a housing with an opening, a handle for the container, a door, and a locking and releasing mechanism for the handle. The door opens or closes the opening in the housing according to the rest position and position of the handle. The handle is articulated on the housing and can be displaced to a retracted rest position and to a deployed position of use. The mechanism includes a first part disposed on the housing and a second part disposed on the handle, wherein the first or second part is arranged on the housing. One of the first and second parts includes as a control track, and the other includes a control pin engaging in the control track. The mechanism includes a third part that includes a lever movably journaled on the housing. The door is journaled for movement in a pivot shaft on the housing and, in its open position, is subjected to a closing force in the direction of its closed position. The lever journaled on the housing has a locking spur which holds the door in its open position until the holder is displaced from the position of use to the position of rest.

The invention has several advantages. For example, due to the movable lever with the locking projection for the door, the door is held in its open position until the supporting arm is shifted manually from its position of use completely into the position of rest. Then the door closes automatically due to the closing force that is applied to it.

According to a further development, the holder is released by the locking mechanism by pressing inward on the closed door. Because the opening force—spring force for example—is greater than the force required to close the door the holder is moved out of its position of rest to the position of use and thus forces the door to its open position in which it is then held by the locking spur.

According to an embodiment, a delayed or damped closing of the door is advantageously achieved so that a high-quality appearance can be achieved by the damped follow-after of the door and, due to the delayed closing the holder, can be shifted manually into its rest position, since the door still remains in the open position for a certain period of time after release by the locking spur.

Other objects, advantages and novel features of the present invention will become apparent from the following detailed description of the invention when considered in conjunction with the accompanying drawings.

BRIEF DESCRIPTION OF THE DRAWINGS

FIG. 2 shows the holder of FIG. 1 in a perspective side view.

DETAILED DESCRIPTION OF THE DRAWINGS

Figure 1:
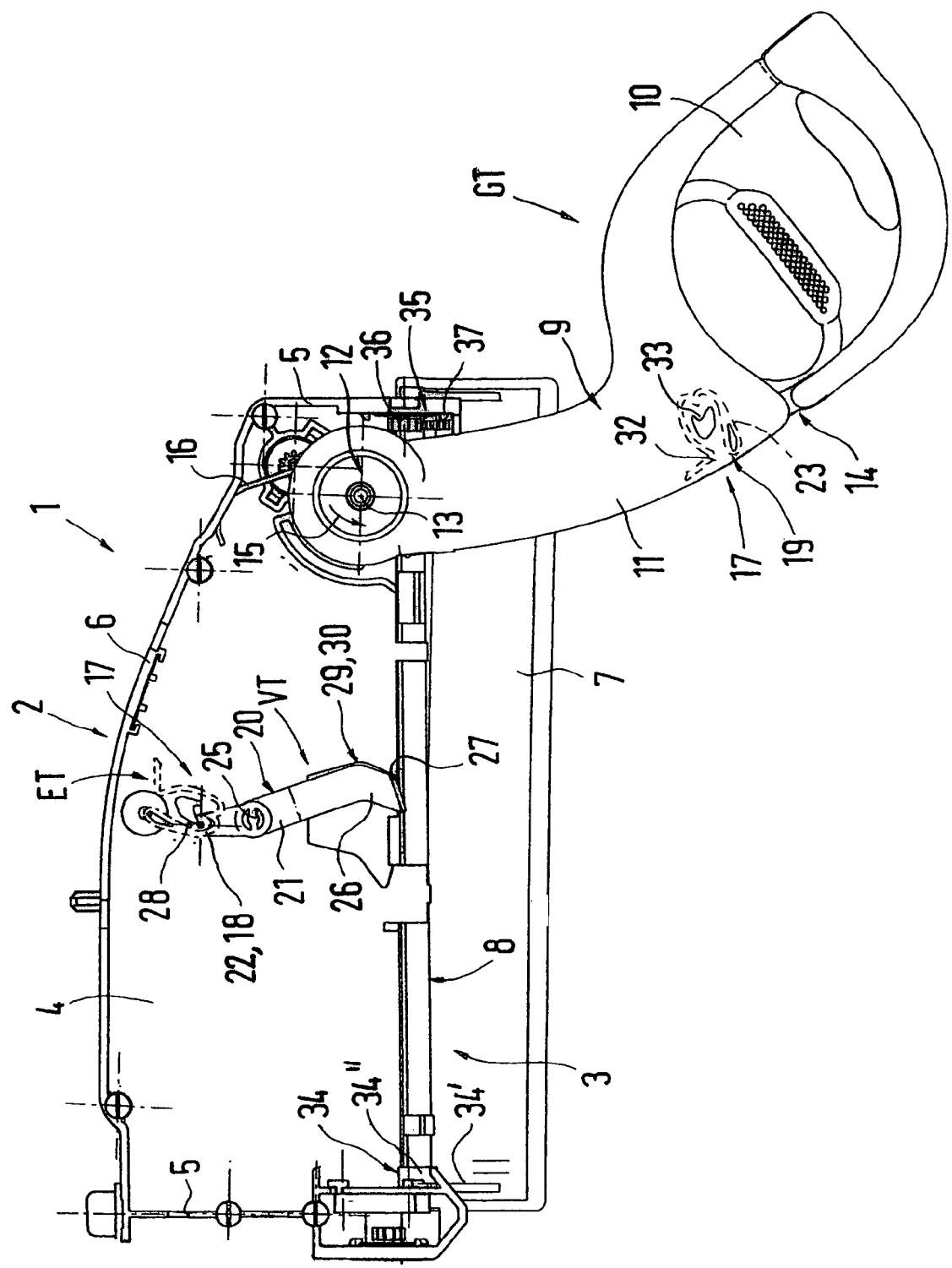
FIG. 1 shows a holder for a beverage and foot container in a plan view.

FIGS. 1 and 2 show a holder 1 for a container for a food and/or beverage, which can be used in a motor vehicle, especially a passenger car, and the holder 1 can be inserted into the vehicle's interior, for example in a switch or instrument panel.

The holder 1 has a housing 2 which can be fully enclosed except for an opening 3. In FIGS. 1 and 2 there is shown a housing bottom 4, lateral walls 5 and a rear wall 6 of the housing 2. Although no housing cover is shown, one can be provided. The housing opening 3 is thus defined by the margins of the housing bottom 4, the lateral walls 5 and, if any, the housing cover. A door 7 is mounted on a pivot shaft 8 on the housing 2 and, when in a closed position, covers the housing opening 3. In an open position OT represented in FIGS. 1 and 2, the housing opening 3 is uncovered by the door 7 which is turned on its pivot shaft 8 to the approximately horizontal open position OT. In this embodiment the door 7 is fastened along its width by the pivot shaft 8 to the housing bottom 4.

On the housing 2 a handle 9 is articulated on the housing 2 such that it can assume a retracted rest position lying within the housing 2, in which it is entirely contained by the housing 2 and the door can assume its closed position. The handle 9 can furthermore be changed to a deployed position GT. In this deployed position GT a grip 10 for the handle 9 extends out of the housing 2. The handle 9 can be made as an arm 11 whose one end 12 is held on the housing 2 in a pivot shaft 13 and whose other end 14 bears the grip 10 in the form of a wrap-around element. In the position of use GT of the handle 9, the door 7 is in its open position OT and opens the housing opening 3, and in its position of rest the door 7 is in the closed position and closes the housing opening 3, so that the door 7 is moved according to the position of the handle 9.

In its rest position within the housing 2, the handle 9 is biased toward the exterior to its position of use GT, which is indicated by an arrow 15 around the swivel axis 13. The bias is applied especially by a spring 16 which has an arm and can be placed around the pivot shaft 13 and thrusts against the housing 2 at one end and against the handle 9 at the other end. In the rest position the handle 9 is held within the housing 2 by a locking and releasing mechanism 17 and released thereby so as to be able to assume the position of use GT about the pivot shaft by the deploying force (arrow 15). The handle locking and releasing mechanism referred to simply as mechanism 17 comprises several parts, at least a first part 18, a second part 19 and third part 20. The first part 18 is disposed on the housing 2, especially on the housing bottom 4, and the second part 19 is disposed on the handle 9. The third part 20 is in the form of a lever 21 held movably on the housing 2, especially on the housing bottom 4, and bears the first part 18. The mechanism 17 is in the form of a so-called push-push mechanism and is made preferably as a cam control which has a control pin 22 and a control track or cam 23. The control pin 22 forms the first part 18, and the control track 23 forms the second part 19 of the mechanism 17. In this embodiment the control pin 22 is disposed on the movably mounted lever 21 and the control track 23 on the handle 9, especially on its underside 24. In FIG. 1, the control track 23 is also shown in dotted line to indicate its position when the handle 9 is in its retracted position in the housing 2. Since the lever 21 in the embodiment is linked to the housing bottom 4, so that both parts 18 and 19 can be brought together in engagement, and the lever 21 is moved in accord with the shape of the control track 23, especially around a pivot shaft 25. It is clear that in another embodiment, not shown here, the control track 23 could be arranged on the lever 21 and the control pin 22 on the handle 9. The lever 21 therefore bears either the first or the second part 18 or 19 and the handle 9 is accordingly equipped with the second or the first part 19 or 18, respectively.

An extension is formed on the lever 21 and engages the door 7 when the door 7 is in its open position OT and blocks the movement of the door 7, so that the door 7 is held in the open position OT. The extension is therefore called hereinafter the locking extension 26 which engages the door 7 close to its pivot shaft 8. The lever 21 has the locking extension 26 at its first end 27, and at its second end 28 the first part 18, which is here the control pin 22. The pivot shaft 25 lies between the two ends 27 and 28, so that the locking extension 26 is turned into the range of the door 7 or out of engagement with the door 7, depending on the mechanism 17 and the course of the control track 23. The locking extension 26 is angled at its free end, and in addition it branches in the area 29 where it joins the lever 21 it has an elbow 30 in two planes, so that the locking extension 26 is at an angle to the housing bottom 4 and to the sidewall 5.

A closing force (arrow 31) is applied to the door 7 in its open position OT and closes the door 7 whenever the locking extension 26 is inactive, i.e., disengages from the door 7. Preferably, the lever 21 assumes a preferred position VT which is set, for example, by spring force, so that the lever 21 assumes the preferred position VT when the control track 23 and the control pin 22 are not engaged with one another, which is the case when the handle 9 leaves its rest position and is brought to the position of use GT. The preferred position VT therefore corresponds to a locking position in which the door 7 is held in the open position OT. If the handle 9 is shifted from the position of use GT to the position of rest, an entry section 32 of control track 23 encounters the control pin 22, so that the control pin 22 is guided further in the control track 23, so that the lever 21 is turned to follow the course of the control track 23. The control track 23 is preferably a so-called cardioid curve with a catch notch 33, in which the locking spur 26 is turned away and the closing force (arrow 31) shifts the door automatically from the open position OT to the closed position to close the opening 3 in the housing. The end position ET of the mechanism 17 is represented by the control track 23 shown in FIG. 1 by the broken line and in FIG. 2 by the solid line.

To limit the opening angle of the door 7 in the open position OT, a limiting device 34 is provided which can be made in the form of a catch 34' which is fastened on the door 7, and on the housing 2 it strikes against a limiting abutment 34".

In the embodiment shown, the closing of the door 7 is performed with damping or delay by a closing force (arrow 31) applied by a corresponding spring device not shown, such as a spring that is placed around the pivot shaft 8, for which a brake 35 acting against the closing force is provided, which acts on the door 7. The brake 35 is in the form of a so-called soft brake which permits a slow closing of the door 7. The brake 35 has as its brake element a braked rotor which is driven through a gear 36, this gear 36 meshing with a toothed sector 37 provided on the door 7.

The door 7 being closed, if the handle 9 is to be changed from its position of rest to the position of use GT, first the door 7 is opened against the closing force (arrow 31) and by forcing the handle past the rest position the mechanism 17 is operated so that the lock on the handle 9 is released. In the embodiment, the control pin 22 is shifted out of the notch 33 and the spring 16 turns the handle 9 to its position of use GT, so that the control track 23 is disengaged from the control pin 22 and the lever 21 is turned to the preferred position VT.

In a preferred embodiment when the door 7 is closed, it can be forced manually further in the direction of the arrow 31, so that it acts upon the handle 9 that is in the position of rest, so that the handle—as described above—is forced further causing the mechanism 17 to unlock and the handle 9 is released in order to be moved by spring 16 into the position of use GT. The deployment force (arrow 15) applied by the spring 16 is then greater than the closing force (arrow 31) produced by the spring system, so that the handle 9 drives the door 7 to the open position OT in which is then held, as described before, by the lever 21 and its locking spur 26.

What is claimed is:

1. A holder for a food and beverage container in a motor vehicle, comprising:
    a housing having an opening;
    a handle for the container articulatingly arranged on the housing and displaceable between a retracted rest position and a deployed position of use;
    a door arranged to open or close the opening in the housing according to the rest position and position of the handle; and
    a handle locking and releasing mechanism including a control track disposed on one of the housing and the handle, and a control pin disposed on the other of the housing and the handle, and engaging in the control track, wherein the mechanism includes a lever movably journaled on the housing, wherein the door is journaled for movement in a pivot shaft on the housing, wherein the door in an open position thereof is subjected to a closing force in the direction of a closed position thereof, and wherein the lever journaled on the housing has a locking spur which holds the door in its open position until the holder is displaced from a position of use thereof to position of rest.

2. The holder according to claim 1, wherein the lever is journaled on the housing.

3. The holder according to claim 1, wherein the locking and releasing mechanism is configured as a push-push mechanism.

4. The holder according to claim 3, wherein the door in its closed position can be operated further in a closing direction thereof and thus the handle can be released by the push-push mechanism, and wherein an arm of the holder can be driven by a deploying force from its position of rest toward its position of use which is greater than the closing force for the door.

5. The holder according to claim 4, wherein the control track of the locking and releasing mechanism is configured as a cardioid cam control.

6. The holder according to claim 1, wherein the control track is disposed on the handle and the control pin is disposed on the lever.

7. The holder according to claim 2, wherein the locking spur is disposed at a first end of the lever, wherein one of the housing and the handle of the locking and releasing mechanism is disposed at a second end of the lever, and wherein the pivot shaft engages the lever between the first and second lever ends.

8. The holder according to claim 1, wherein the handle is articulated for turning on the housing.

9. The holder according to claim 1, further comprising a brake acting against the closing force, on which brake the door subject to the closing force is supported, and wherein the brake causes a delayed or damped movement of the door from the open position to the closed position.

10. The holder according to claim 1, wherein the control track of the locking and releasing mechanism is configured as a cardioid cam control.

11. The holder according to claim 1, wherein the control track is disposed on the handle and the control pin is disposed on the lever.

12. The holder according to claim 1, wherein the locking spur is disposed at a first end of the lever, wherein one of the housing and the handle of the locking and releasing mechanism is disposed at a second end of the lever, and wherein the pivot shaft engages the lever between the first and second lever ends.

13. A method of making a holder for a food and beverage container in a motor vehicle, comprising: providing a housing having an opening;

providing a handle for the container, which is articulated on the housing and can be displaced to a retracted rest position and to a deployed position of use;

providing a door which opens or closes the opening in the housing according to the rest position and position of the handle;

providing a handle locking and releasing mechanism that includes one of a control track or control pin on the housing, the other of the control track or control pins, on the handle; and a lever movably journaled on the housing;

journaling the door for movement in a pivot shaft on the housing; and subjecting the door in an open position thereof to a closing force in the direction of a closed position thereof, and wherein the lever journaled on the housing has a locking spur which holds the door in its open position until the holder is displaced from the deployed position of use to the retracted position of rest.

* * * * *